(12) United States Patent
Wong et al.

(10) Patent No.: US 6,961,281 B2
(45) Date of Patent: Nov. 1, 2005

(54) SINGLE RANK MEMORY MODULE FOR USE IN A TWO-RANK MEMORY MODULE SYSTEM

(75) Inventors: Tayung Wong, Fremont, CA (US); Clement C. Fang, Cupertino, CA (US); David J. Jeffrey, Santa Cruz, CA (US); Neil N. Duncan, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 82 days.

(21) Appl. No.: 10/661,872

(22) Filed: Sep. 12, 2003

(65) Prior Publication Data

US 2005/0058001 A1 Mar. 17, 2005

(51) Int. Cl.[7] .............................................. G11C 8/00
(52) U.S. Cl. .................. 365/230.03; 365/222; 365/233
(58) Field of Search ........................... 365/230.03, 222, 365/233

(56) References Cited

U.S. PATENT DOCUMENTS

| | | | | |
|---|---|---|---|---|
| 5,535,169 A | * | 7/1996 | Endo et al. ............ | 365/230.03 |
| 5,959,930 A | * | 9/1999 | Sakurai ................. | 365/230.03 |
| 6,108,745 A | | 8/2000 | Gupta et al. | |
| 6,115,314 A | * | 9/2000 | Wright et al. ............... | 365/233 |
| 6,134,168 A | * | 10/2000 | Harrington et al. ......... | 365/222 |
| 6,414,868 B1 | | 7/2002 | Wong et al. | |
| 6,636,957 B2 | * | 10/2003 | Stevens et al. ............. | 711/171 |
| 2002/0002662 A1 | | 1/2002 | Olarig et al. | |
| 2003/0090879 A1 | | 5/2003 | Doblar et al. | |

FOREIGN PATENT DOCUMENTS

WO    02/28162    4/2002

* cited by examiner

*Primary Examiner*—Trong Phan
(74) *Attorney, Agent, or Firm*—Meyertons Hood Kivlin Kowert & Goetzel, P.C.; B. Noël Kivlin; Stephen J. Curran

(57) ABSTRACT

A memory module for use in a two rank memory module system includes a plurality of memory devices and a control circuit. In one embodiment, the control circuit may be configured to generate a chip select signal that is provided to each of the memory devices. The chip select signal may be dependent upon assertions of a first bank chip select signal and a second bank chip select signal received from a memory controller. The control circuit may be further configured to generate an address signal that is provided to each of the memory devices. The address signal may be asserted dependent upon which of the first bank chip select signal and the second bank chip select signal are asserted.

23 Claims, 5 Drawing Sheets

Memory Module Pin Assignment 400

| Pin No. | Pin Name | Pin No. | Pin Name | Pin No. | Pin Name | Pin No. | Pin Name | Pin No. | Pin Name |
|---|---|---|---|---|---|---|---|---|---|
| 1 | VSS | 48 | AD1 | 95 | VSS | 142 | VDD | 189 | DQ78 |
| 2 | DQ0 | 49 | AD2 | 96 | DQ112 | 143 | DQ44 | 190 | DQ79 |
| 3 | DQ1 | 50 | AD3 | 97 | DQ113 | 144 | DQ45 | 191 | VSS |
| 4 | DQ2 | 51 | VSS | 98 | DQ114 | 145 | DQ46 | 192 | DQ84 |
| 5 | DQ3 | 52 | AD8 | 99 | DQ115 | 146 | DQ47 | 193 | DQ85 |
| 6 | VDD | 53 | AD9 | 100 | VDD | 147 | VSS | 194 | DQ86 |
| 7 | DQ8 | 54 | AD10 | 101 | DQ120 | 148 | DQ52 | 195 | DQ87 |
| 8 | DQ9 | 55 | VDD | 102 | DQ121 | 149 | DQ53 | 196 | VDD |
| 9 | DQ10 | 56 | RAS0\ | 103 | DQ122 | 150 | DQ54 | 197 | DQ92 |
| 10 | DQ11 | 57 | WE0\ | 104 | DQ123 | 151 | DQ55 | 198 | DQ93 |
| 11 | VSS | 58 | VSS | 105 | VSS | 152 | VDD | 199 | DQ94 |
| 12 | DQ16 | 59 | RAS1\ | 106 | DQ128 | 153 | DQ60 | 200 | DQ95 |
| 13 | DQ17 | 60 | OE0\ | 107 | DQ129 | 154 | DQ61 | 201 | VSS |
| 14 | DQ18 | 61 | VSS | 108 | DQ130 | 155 | DQ62 | 202 | DQ100 |
| 15 | DQ19 | 62 | CLK+ | 109 | DQ131 | 156 | DQ63 | 203 | DQ101 |
| 16 | VDD | 63 | CLK- | 110 | VDD | 157 | VSS | 204 | DQ102 |
| 17 | DQ24 | 64 | VSS | 111 | DQ136 | 158 | DQ68 | 205 | DQ103 |
| 18 | DQ25 | 65 | CS0 | 112 | DQ137 | 159 | DQ69 | 206 | VDD |
| 19 | DQ26 | 66 | SA0 | 113 | DQ138 | 160 | DQ70 | 207 | DQ108 |
| 20 | DQ27 | 67 | SA1 | 114 | DQ139 | 161 | DQ71 | 208 | DQ109 |
| 21 | VSS | 68 | SA2 | 115 | NC | 162 | VDD | 209 | DQ110 |
| 22 | DQ32 | 69 | VDD | 116 | VSS | 163 | AD4 | 210 | DQ111 |
| 23 | DQ33 | 70 | AD14 | 117 | VSS | 164 | AD5 | 211 | VSS |
| 24 | DQ34 | 71 | DQ72 | 118 | DQ4 | 165 | AD6 | 212 | DQ116 |
| 25 | DQ35 | 72 | DQ73 | 119 | DQ5 | 166 | AD7 | 213 | DQ117 |
| 26 | VDD | 73 | DQ74 | 120 | DQ6 | 167 | VSS | 214 | DQ118 |
| 27 | DQ40 | 74 | DQ75 | 121 | DQ7 | 168 | AD11 | 215 | DQ119 |
| 28 | DQ41 | 75 | VSS | 122 | VDD | 169 | AD12 | 216 | VDD |
| 29 | DQ42 | 76 | DQ80 | 123 | DQ12 | 170 | AD13 | 217 | DQ124 |
| 30 | DQ43 | 77 | DQ81 | 124 | DQ13 | 171 | VDD | 218 | DQ125 |
| 31 | VSS | 78 | DQ82 | 125 | DQ14 | 172 | CAS0\ | 219 | DQ126 |
| 32 | DQ48 | 79 | DQ83 | 126 | DQ15 | 173 | WE1\ | 220 | DQ127 |
| 33 | DQ49 | 80 | VDD | 127 | VSS | 174 | VSS | 221 | VSS |
| 34 | DQ50 | 81 | DQ88 | 128 | DQ20 | 175 | CAS1\ | 222 | DQ132 |
| 35 | DQ51 | 82 | DQ89 | 129 | DQ21 | 176 | OE1\ | 223 | DQ133 |
| 36 | VDD | 83 | DQ90 | 130 | DQ22 | 177 | VSS | 224 | DQ134 |
| 37 | DQ56 | 84 | DQ91 | 131 | DQ23 | 178 | CLKE0 | 225 | DQ135 |
| 38 | DQ57 | 85 | VSS | 132 | VDD | 179 | CLKE1 | 226 | VDD |
| 38 | DQ58 | 86 | DQ96 | 133 | DQ28 | 180 | DQM0 | 227 | DQ140 |
| 40 | DQ59 | 87 | DQ97 | 134 | DQ29 | 181 | DQM1 | 228 | DQ141 |
| 41 | VSS | 88 | DQ98 | 135 | DQ30 | 182 | CS1 | 229 | DQ142 |
| 42 | DQ64 | 89 | DQ99 | 136 | DQ31 | 183 | SCLK | 230 | DQ143 |
| 43 | DQ65 | 90 | VDD | 137 | VSS | 184 | SDA | 231 | Bypass |
| 44 | DQ66 | 91 | DQ104 | 138 | DQ36 | 185 | VDD | 232 | VSS |
| 45 | DQ67 | 92 | DQ105 | 139 | DQ37 | 186 | AD15 | | |
| 46 | VDD | 93 | DQ106 | 140 | DQ38 | 187 | DQ76 | | |
| 47 | AD0 | 94 | DQ107 | 141 | DQ39 | 188 | DQ77 | | |

*FIG. 4*

SINGLE RANK MEMORY MODULE FOR USE IN A TWO-RANK MEMORY MODULE SYSTEM

BACKGROUND OF THE INVENTION

1. Field of the Invention

This invention relates to computer system memories and, more particularly, to memory module configurations.

2. Description of the Related Art

Many modern computer systems allow for memory expansion using memory modules. Two commonly used types of memory modules are single inline memory modules (SIMMs) and dual inline memory modules (DIMMs). SIMMs and DIMMs include small, compact circuit boards that are designed to mount easily into an expansion socket mounted on another circuit board, such as a computer system motherboard. The memory module circuit boards used to implement SIMMs and DIMMs include an edge connector that has contact pads or pins that are typically arranged on both sides of the circuit board. On SIMMs, opposing contact pads are connected together (i.e. shorted), and thus carry the same signal, while at least some of the opposing contact pads on DIMMs are not connected together, thus allowing different signals to be carried on opposing contact pads. Accordingly, DIMMs typically have a higher signal density than SIMMs.

Many memory devices mounted on SIMMs and DIMMs are devices in the Dynamic Random Access Memory (DRAM) family of devices or 'chips'. Examples of some DRAM chips include Synchronous DRAM (SDRAM) chips and Double Data Rate SDRAM (DDRSDRAM) chips. SIMMs and DIMMs are normally available in various total memory capacities. For example, they may be available in 64, 128 or 256 Megabyte capacities. The various capacities are achieved in several ways. The first is selection of memory chips having a given address space and byte size. For example, a given chip may have a four-megabyte address space (i.e., four million separate addressable memory locations, with each location storing sixteen bits). Such a chip can provide storage of four million sixteen-bit words, and may be referred to as a 4M×16 chip. Since memory capacity is often rated in terms of how many eight bit words the memory stores, such a chip may be considered to have eight-megabyte memory capacity. For a given size of memory chip, memory module capacity can be increased by using multiple chips on a board and increasing data bus width so that the data at the same addressed location in each chip can be read out to the bus simultaneously. For example, if three 4M×16 chips are used, the bus width would need to be at least forty-eight to allow all of the bits at a selected address to be read out to the bus at the same time. A module with three 4M×16 chips can be considered to have a total capacity of twelve million sixteen-bit bytes, but may be called a twenty-four megabyte memory in terms of eight-bit bytes.

From the above examples, it may be shown that reliability of a memory module may decrease with an increase in memory capacity and data path width. If the data path width increases due to an increase in the number of memory chips used to create the width, then the failure rate for the memory module increases. One method of calculating the average life of the memory module is the parts count method. Using the parts count method, the mean time between failure (MTBF) of an assembly (e.g., memory module) is calculated using the inverse of the sum the individual failure rates of each component. Thus, if the number of components increases, then the failure rate for the memory module increases and the MTBF decreases.

In addition, as higher capacity memory devices become available in the market, at some point in the higher capacity memory device timeline, the higher capacity devices enter what is referred to as the "sweet spot" of the price/performance charts. This generally means to the purchaser, that the device cost on a per bit basis gives the best cost for a given amount of performance. Thus, if a purchaser continues to use older smaller capacity devices, the will move out of the sweet spot since the performance may no longer be in the desired range for a given cost model. Thus, it is generally desirable to use devices that are in the sweet spot of the price/performance chart. To that end, it may make sense to transition to using higher capacity memory devices on a given memory module even while the given memory module is still widely used. However in many cases, doing so may present system compatibility issues.

SUMMARY OF THE INVENTION

Various embodiments of a memory module for use in a two rank memory module system are disclosed. In one embodiment, the memory module includes a plurality of memory devices and a control circuit. The control circuit may be configured to generate a chip select signal that is provided to each of the memory devices. The chip select signal may be dependent upon assertions of a first bank chip select signal and a second bank chip select signal received from a memory controller. The control circuit may be further configured to generate an address signal that is provided to each of the memory devices. The address signal may be asserted dependent upon which of the first bank chip select signal and the second bank chip select signal are asserted.

BRIEF DESCRIPTION OF THE DRAWINGS

FIG. 4 is a pin assignment table for the memory modules of FIG. 2 and FIG. 3.

Figure 1:
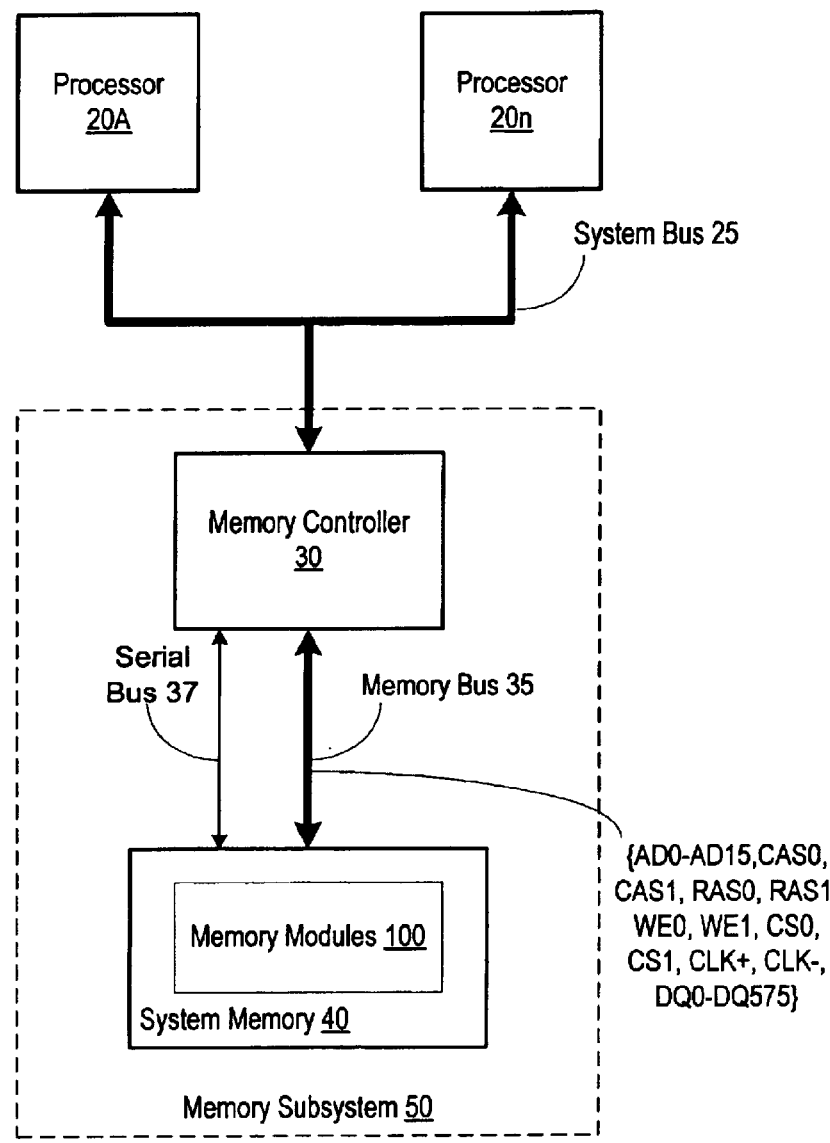
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of a computer system 10 is shown. Computer system 10 includes a plurality of processors 20–20n connected to a memory subsystem 50 via a system bus 25. Memory subsystem 50 includes a memory controller 30 coupled to a system memory 40 via a memory bus 35 and a serial bus 37. It is noted that, although two processors and one memory subsystem are shown in FIG. 1, embodiments of computer system 10 employing any number of processors and memory subsystems are contemplated. In addition, elements referred to herein with a particular reference number followed by a letter may be collectively referred to by the reference number alone. For example, processor 20A–n may be collectively referred to as processor 20.

Memory subsystem 30 is configured to store data and instruction code within system memory 40 for use by processor 20. As will be described further below, in one embodiment, system memory 40 may be implemented using a plurality of memory modules 100. In one embodiment, memory modules 100 may be implemented using DIMMs. As noted above, each DIMM may employ a plurality of memory chips in the DRAM family of chips as SDRAM or DDRSDRAM chips, for example. Each DIMM may be mated to a system memory board via an edge connector and socket arrangement. In one embodiment, the socket may be located on a memory subsystem circuit board and each DIMM may have an edge connector which may be inserted into the socket, for example.

Generally speaking, processor 20 or an I/O device (not shown) may access memory subsystem 50 by initiating a memory request transaction such as a memory read or a memory write to memory controller 30 via system bus 25. Memory controller 30 may then control the storing to and retrieval of data from system memory 40 by issuing memory request commands to system memory 40 via memory bus 35. Memory bus 35 conveys address and control information and data between system memory 40 and memory controller 30. The address and control information may be conveyed to each DIMM in a point-to-multipoint arrangement while the data may be conveyed directly between each memory chip on each DIMM and memory controller 30 in a point-to-point arrangement. The point-to-multipoint arrangement is sometimes referred to as a multi-drop topology.

In one embodiment, memory bus 35 includes address and control information such as address signals AD0–AD15, column address strobes CAS0 and CAS1, row address strobes RAS0 and RAS, write enable signals WE0 and WE1, bank chip select signals CS0 and CS1 and clock signals CLK+ and CLK−. In addition in one embodiment, memory bus 35 may include a 576-bit data path including data signals DQ0–DQ575, with 144 (e.g., DQ0–143 to DIMM 0, DQ144–287 to DIMM 1, and so on) data pins being routed between memory controller 30 and each DIMM. It is noted that depending on the implementation, address signals AD12–AD15 received on the DIMM connector from memory controller 30 may be used as bank select signals BS0 and BS1, and address signals AD12 and AD13 on the memory devices.

Generally speaking, SDRAM devices may be accessed in a burst-oriented mode. Typically, accesses start at a selected location and continue for a programmed number of locations in a programmed sequence. Accesses begin with the registration of an ACTIVE command, which is then followed by a READ or WRITE command. The address bits registered coincident with the ACTIVE command are used to select the bank and row to be accessed. For example, BA0 and BA1 may select the bank, and A0–A11 may select the row. The address bits registered coincident with the READ or WRITE command are used to select the starting column location for the burst access. A command typically includes an encoding of signals such as the CS, RAS, CAS and WE along with the appropriate address and data signals. Prior to normal operation, most SDRAMs must be initialized, which includes having their respective mode register programmed.

As described above, memory devices come in a variety of sizes and configurations. Further, it may be desirable to transition to higher capacity memory devices on a given memory module and to continue to use that same memory module in a given system. However as noted above, doing so may introduce compatibility issues. One example of such a compatibility issue is as follows: If a given memory module has a 256 MB capacity using a number of 128 MB SDRAM devices in an 8M×16 configuration, reconfiguring the module to use fewer, but higher capacity memory devices (e.g., 256 MB SDRAM devices in a 16M×16 configuration) while still providing an overall 256 MB capacity may change the entire address and control scheme for the memory module. Thus, in computer system 10, memory subsystem 30 may be incapable of using the new memory module. To avoid such compatibility issues, the memory modules having the higher capacity memory devices must be made to appear the same as the memory modules using the lower capacity memory devices to memory controller 30.

Most memory modules may come in either a single rank or a dual rank configuration. The rank typically refers to whether both sides of the memory module are populated with memory chips and how the memory chips are logically arranged. For example, a single rank module may only have memory chips located on one side and a dual rank module may have memory chips located on both sides of the module. Further, on some dual rank modules, each rank may be accessed via a different address and control signals (e.g., a different chip select signal). Thus, a 256 MB capacity memory module may be implemented using two ranks of 128 MB memory chips. Alternatively, a 256 MB capacity memory module may be implemented using one rank of 256 MB memory chips. However in conventional computer systems, a single rank memory module may not be used in a system designed for a dual rank memory module and vice versa.

Figure 2:
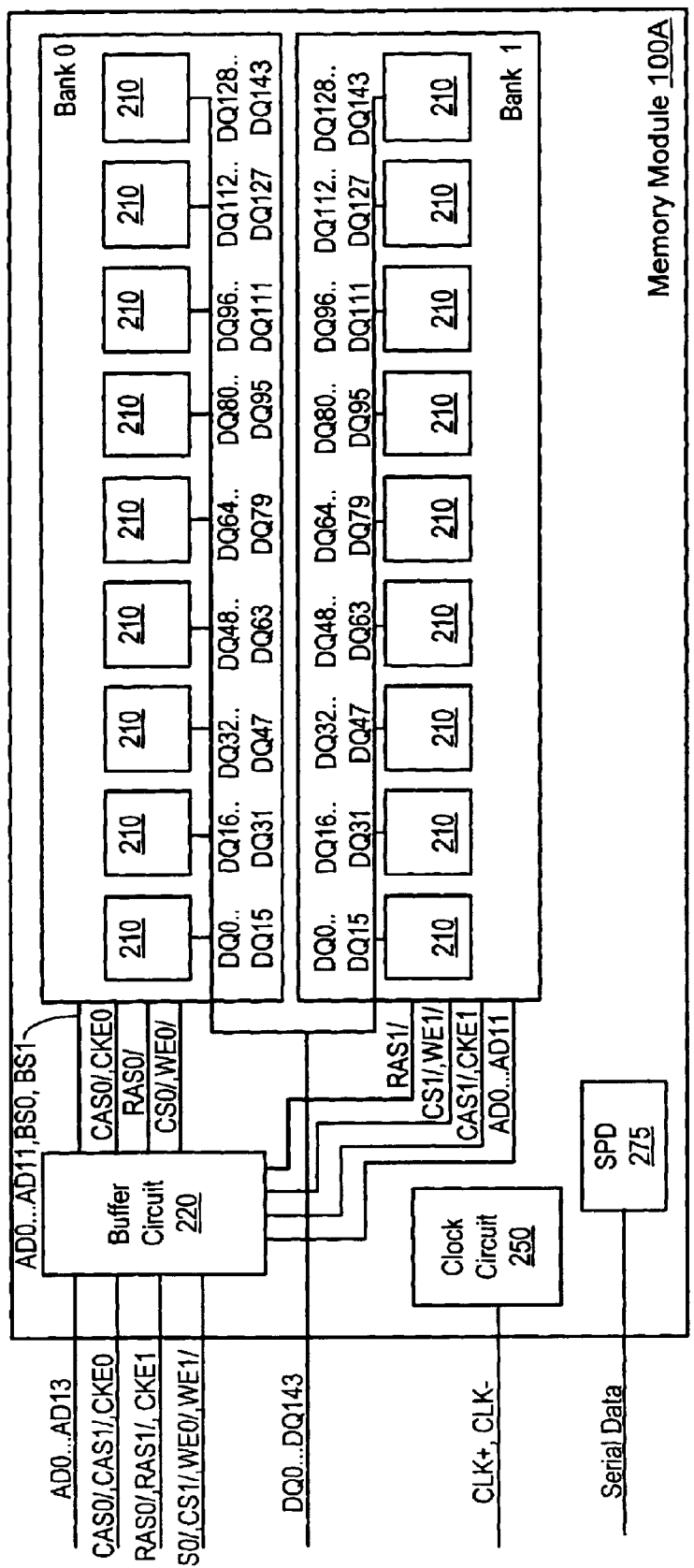
FIG. 2 is a diagram illustrating one embodiment of a two-rank memory module.
Figure 3:
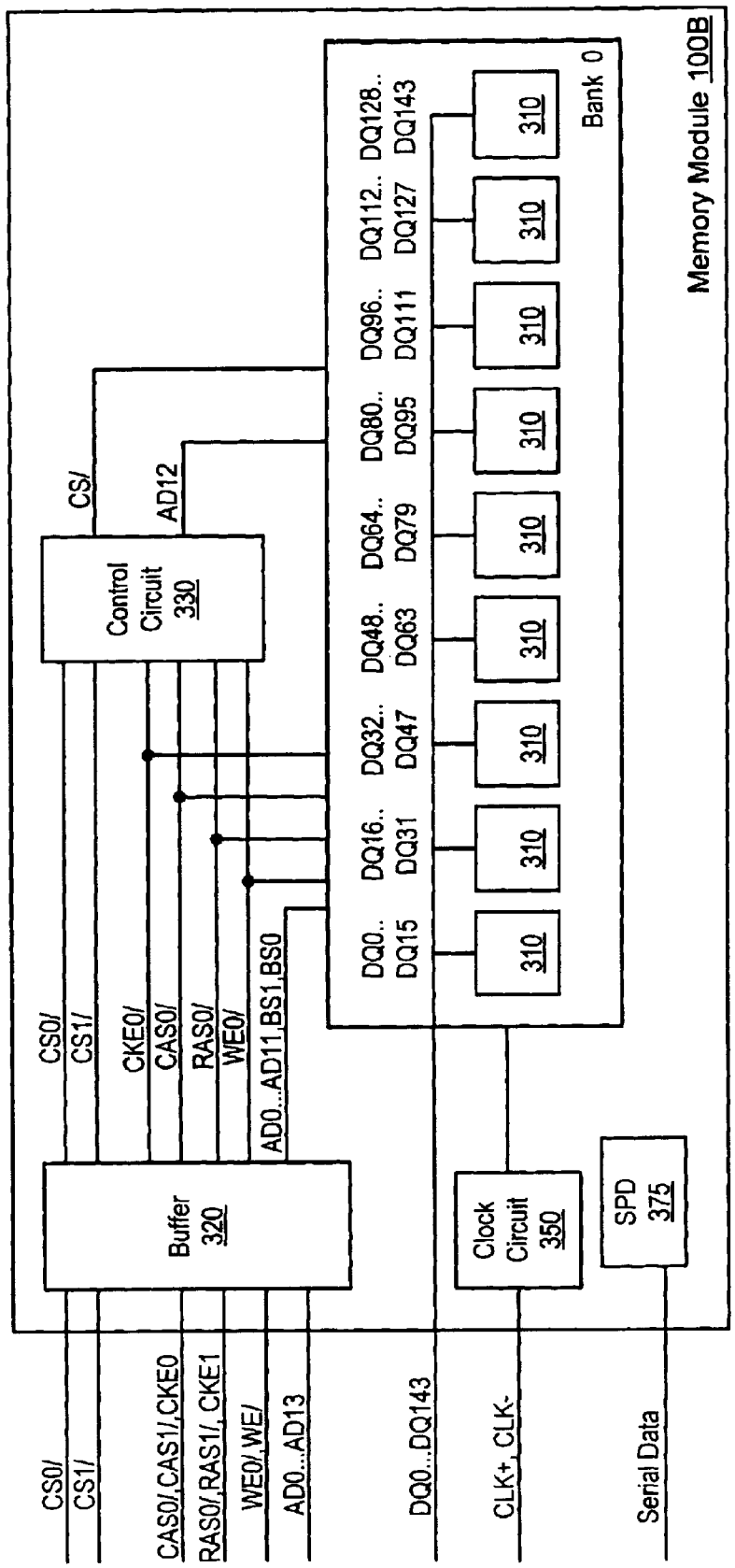
FIG. 3 is a diagram illustrating one embodiment of a single rank memory module with the same storage capacity of the memory module of FIG. 2.

As will be described in greater detail below in conjunction with the descriptions of FIG. 2 and FIG. 3, the memory module of FIG. 2 is implemented as a 256 MB module using 128 MB SDRAM devices in a dual rank 8 MB×16 configuration and the memory module of FIG. 3 is implemented as a 256 MB module that is compatible with the memory module of FIG. 2 while using higher capacity 256 MB SDRAM devices in a single rank 16 MB×16 configuration. It is noted that in one embodiment, the memory module of FIG. 2 and the memory module of FIG. 3 may be compatible with a family of memory modules that are referred to as next generation (NG) DIMMs by Sun Microsystems, Inc.

Referring to FIG. 2, a block diagram of one embodiment of a two-rank memory module is shown. Memory module 100A includes a circuit board with eighteen memory devices 210 arranged into two banks (e.g., bank 0 and bank 1) mounted to it. In addition, memory module 100A includes a buffer circuit 220 and a clock circuit 250 that are coupled to the memory devices 210. Further, memory module 100A includes a serial presence detect (SPD) device 275. It is noted that in one embodiment, each bank may be physically located on a given side of the circuit board of memory module 100A.

In the illustrated embodiment, the nine memory devices 210 included within bank 0 are coupled to the data path (e.g., DQ0–DQ143). In addition, the nine memory devices 210 included within bank 1 are also coupled to the data path (e.g., DQ0–DQ143). Specifically, a given memory device 210 in each bank is coupled to a same respective set of data signals (e.g., DQ0–15). Thus, every set of data signals has two memory devices 210 (one from each bank) coupled to it.

In the illustrated embodiment, memory module 100A is configured to receive address, control and data signals as well as a serial data from a memory controller such as memory controller 30 of FIG. 1, for example. In the illustrated embodiment, memory module 100A is coupled to address signals AD0–AD13 and control signals CAS0/, CAS1/, RAS0/, RAS1/, CKE0, CKE1, WE0, WE1, CS0/, CS1/, CLK+, and CLK−. In addition, memory module 100A is coupled to 144 data signals. In the illustrated embodiment, the data signals are designated as DQ0–DQ143. However, as described above, each memory module may include 144 data signals and they may be designated DQ144–287, or DQ288–431, etc . . . Memory module 100A is also coupled to a serial interface (e.g. serial bus 37) such as an Inter-IC (I2C®) bus, developed by Philips Semiconductors, Inc., for example, for connection between SPD 275 and the memory controller. It is noted that signal names followed by a '/' are indicative of active low signals.

Buffer circuit 220 is used to buffer the address and control signals received at the DIMM socket from the memory controller and to drive the address and control signals to memory devices 210. In one embodiment, to adequately drive memory devices 210, each input to buffer circuit 220 may have two or more duplicate corresponding outputs. However, other embodiments may have a single output for each input.

In one embodiment, the memory devices 210 associated with each bank (e.g., bank 0 and bank 1) may be accessed using the bank chip select signals CS0/ and CS1/, respectively. Thus, each bank may be associated with a given address range. Accordingly, one bank may be accessed using one bank chip select on one clock edge and the other bank may be accessed using the other bank chip select on a next clock edge. This may allow data to be retrieved every two clocks.

During operation, the memory controller sends complete sets of control signals for each bank (e.g., CAS0/ and CAS1/). In addition, since two banks are used, only address signals A0–A11 are necessary to address 256 MB of addressable space. One bank may be used to store the lower 128 MB and the second bank may be used to store the upper 128 MB of addressable space with the chip selects being used to select between the two. Address signals AD12 and AD13 are used as memory device internal bank select signals BS0 and BS1.

Generally speaking, the DRAM family of devices such as memory devices 210 must be refreshed periodically at a refresh rate that is generally manufacturer specific. SDRAM-type devices typically decode a refresh command sent by the memory controller. The refresh command may also be manufacturer specific, but it generally includes decoding one or more of the control signals in combination with an active chip select into a refresh command. In one embodiment, the bank 0 memory devices 210 may be refreshed by decoding a refresh command from the memory controller in combination with an active CS0/ signal, while the bank 1 memory devices 210 may be refreshed by decoding a refresh command from the memory controller in combination with an active CS1/signal.

As described above, memory module 100A may be implemented as a two rank 256 MB module using two banks of nine 128 MB memory devices. Thus, each of memory devices 210 may be a 128 MB SDRAM device in a 8 MB×16 configuration. In one embodiment, the data path of 144 data signals includes 128 data signals and 16 redundant data signals. Thus, for each bank of nine memory devices 210, one memory device may be used to store redundant data.

Clock circuit 250 may be configured to generate clock signals derived from the differential clock signals CLK+ and CLK−. For example, in one embodiment, clock circuit 250 may include a phase locked loop (PLL) circuit configured to generate clock signals for memory devices 210.

SPD 275 may be configured to provide information from memory module 100A to the memory controller corresponding to the memory module's properties and functionality. For example, SPD 275 is a storage unit that may store information such as the number of row addresses and column addresses for memory devices 210, the number of banks, etc. The ability to read this information may allow the memory controller to be configured specifically for the type of memory module being used. In one embodiment, SPD 275 is a serially accessible storage such as an electrically erasable programmable read only (EEPROM) device.

Turning to FIG. 3, a block diagram of one embodiment of a single rank memory module is shown. Memory module 1001B includes a circuit board having nine memory devices 310 arranged into one bank (e.g., bank 0) mounted to it. In addition, memory module 1001B includes a buffer circuit 320, a clock circuit 350 and a control circuit 330 that are coupled to the memory devices 310. Further, memory module 1001B includes SPD device 375.

In the illustrated embodiment, there are nine memory devices 310 included within bank 0 and they are coupled to the data path (e.g., DQ0–DQ143). Specifically, a given memory device 310 is coupled to a respective set of data signals (e.g., DQ0–15). Thus, every set of data signals has one memory device 310 coupled to it.

In the illustrated embodiment, memory module 100B is configured to receive address, control and data signals as well as a serial data from a memory controller such as memory controller 30 of FIG. 1, for example. In the illustrated embodiment, memory module 100B is coupled to address signals AD0–AD13 and control signals CAS0/, CAS1/, RAS0/, RAS1, CKE0, CKE1, WE0, WE1, CS0/, CS1/, CLK+, and CLK−. In addition, memory module 100B is coupled to 144 data signals. In the illustrated embodiment, the data signals are designated as DQ0–DQ143. However, as described above, each memory module may include 144 data signals and they may be designated DQ144–287, or DQ288–431, etc. Memory module 100B is also coupled to a serial interface (e.a. serial bus 37) such as an Inter-IC (I2C®) bus, developed by Philips Semiconductors, Inc., for example, for connection between SPD 375 and the memory controller.

As will be described in greater detail below in conjunction with the description of FIG. 5A, buffer circuit 320 is used to buffer the address and control signals received at the DIMM socket from the memory controller and to drive the address and control signals to memory devices 310. In one embodiment, to adequately drive memory devices 310, each input to buffer circuit 320 may have two or more duplicate corresponding outputs. However, other embodiments may have a single output for each input.

Since memory module 100B is compatible with memory module 100A, during operation, the memory controller sends complete sets of control signals for each bank (e.g., CAS0/ and CAS1/, etc . . . ). However, since only one bank is used on memory module 100B, address signals A0–A11 are not sufficient to address the full 256 MB of addressable space. Further, since address signals AD12 and AD13 are used as memory device internal bank select signals BS0 and BS1, an AD12 signal must be generated on memory module 100B.

As will be described in greater detail below in conjunction with the description of FIG. 5B, control circuit 330 includes logic which may be configured to decode the bank chip select signals CS0/and CS1/and to generate a single chip select signal designated CS/ for enabling the single bank of memory devices 310. In addition, control circuit 330 may be configured to generate an address signal designated AD12 for addressing the upper 128 MB of addressable locations. In one embodiment, control circuit 330 may be implemented as a programmable logic device (PLD) such as an erasable PLD (EPLD), although other embodiments are contemplated in which control circuit 330 is implemented as either one or more dedicated application specific integrated circuits (ASIC) or discrete combinatorial logic devices.

As described above in conjunction with the description of FIG. 2, memory devices 210 must be refreshed periodically at a refresh rate that is generally manufacturer specific. Similarly, memory devices 310 of FIG. 3 must also be refreshed periodically. In one embodiment, memory devices 310 may be refreshed by control circuit 330 decoding a refresh command from the memory controller in combination with an active CS0/ signal and generating an appropriate CS/ signal. Since the memory controller may be configured to refresh two banks, control circuit 330 may be configured to ignore the refresh command sent for the nonexistent second bank.

As described above, memory module 100B may be implemented as a single rank 256 MB module using one banks of nine 256 MB memory devices. Thus, each of memory devices 310 may be a 256 MB SDRAM device in a 16 MB×16 configuration. In one embodiment, the data path of 144 data signals includes 128 data signals and 16 redundant data signals. Thus, for the bank of nine memory devices 310, one memory device may be used to store redundant data.

Clock circuit 350 may be configured to generate clock signals derived from the differential clock signals CLK+ and CLK−. For example, in one embodiment, clock circuit 350 may include a phase locked loop (PLL) circuit configured to generate clock signals for memory devices 310.

SPD 375 may be configured to provide information from memory module 100A to the memory controller corresponding to the memory module's properties and functionality. For example, SPD 375 is a storage unit that may store information such as the number of row addresses and column addresses for memory devices 310, the number of banks, etc. In addition, SPD 375 may store the rank, storage capacity and error history of memory module 100B. The ability to read this information may allow the memory controller to be configured specifically for the type of memory module being used and to aid the system processor or service processor (not shown) in determining the cause of memory errors. In one embodiment, SPD 375 is a serially accessible storage such as an electrically erasable programmable read only (EEPROM) device.

It is noted that, by using a single rank module having the same capacity as a two-rank module but using fewer memory devices, a savings in power and cost may be realized. In addition, a reduced module failure rate, which translates to an increased MTBF may be realized. Further, the use of either module may be transparent to the user, since the single rank module may 'look' the same as the two-rank module to the memory controller due to the use of control circuit 330.

Turning now to FIG. 4, a pin assignment table for the memory modules of FIG. 2 and FIG. 3 is shown. As described above, memory modules 100A and 100B may both be compatible with the family of DIMMs referred to as NG DIMMs. Accordingly, both memory modules 100A and 100B may have edge connectors having the same contact pin assignment. Memory module pin assignment table 400 is an exemplary diagram illustrating the numbering of the contact pins and the signals assigned to the corresponding pin numbers associated with the edge connector of memory module 100A and 101B of FIG. 2 and FIG. 3, respectively. Pin assignment table 400 includes multiple rows and columns. The columns are labeled Pin Number and Pin Name. Therefore, each pin number has a corresponding pin name associated with it. For example, Pin number 1 is referenced as VSS. Pin number 2 is referenced DQ0 and so forth. In this particular embodiment, the ground pins are referenced VSS and the power pins are referenced VDD. Further, the data signal pin names are DQ0–DQ143 and the address signal pin names are AD0–AD15.

Figures 5A, 5B:
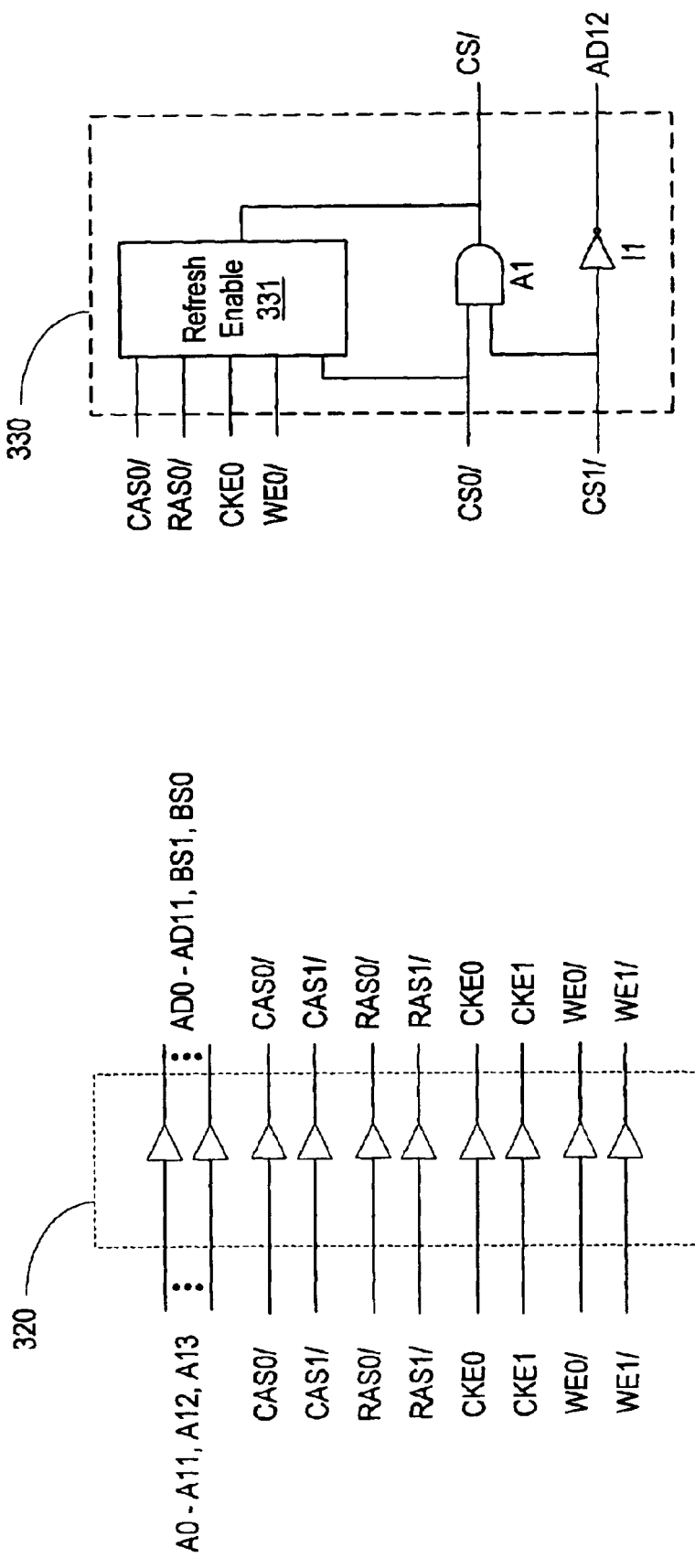
FIG. 5A is a diagram illustrating one embodiment of the buffer circuit of FIG. 3.
FIG. 5B is a diagram illustrating one embodiment of the control circuit of FIG. 3.

Referring to FIG. 5A, a diagram of one embodiment of the buffer circuit of FIG. 3 is shown. Buffer circuit 320 includes one or more integrated circuits including a plurality of inputs and outputs configured to buffer received address and control signals and to drive the address and control signals.

In one embodiment, buffer circuit 320 is a BiCMOS line driver IC. Each input may drive two outputs, thereby decreasing the load on each output. Accordingly, each output may drive either four or five memory devices 310.

Referring to FIG. 5B, a diagram of one embodiment of the control circuit of FIG. 3 is shown. Control circuit 330 includes combinatorial logic configured to decode the received chip select signals CS0/ and CS1/into a single chip select CS/ and an AD12 signal. For example, an exemplary truth table for the chip select and address decode is shown in Table 1 below.

TABLE 1

Chip Select truth table

| CS0/ | CS1/ | CS/ | AD12 |
|------|------|-----|------|
| L | L | L | H |
| L | H | L | L |
| H | L | L | H |
| H | H | H | L |

According to the truth table shown above, in response to receiving an active CS0/ signal, the lower 128 MB addresses of memory devices 310 are accessible via an active CS/ signal generated by control circuit 330. In addition, in response to receiving an active CS1/, the upper 128 MB addresses of memory devices 310 are accessible via an active CS/ signal and an active AD12 signal generated by control circuit 330.

It is noted that in other embodiments, control circuit 330 may include sequential elements such as flip-flops (not shown), for example, which may be used to latch or capture received signals.

In addition, in the illustrated embodiment, control circuit 330 includes refresh enable logic 331 that is configured to decode the received control signals into a refresh command for bank 0 only. A refresh command targeted for bank 1 is ignored. Accordingly, in response to receiving control signals that are decoded into a refresh command, a CS/ is generated by refresh enable circuit 331.

It is noted that the AND gate A1 and inverter I1 are representative of the combinatorial logic included within control circuit 330 and that other embodiments may include other logic circuit arrangements having similar functionality. Accordingly, in one embodiment, an active CS/ signal may be generated by control circuit 330 in response to receiving the combination of CS0/ and CS1/ signals shown in the truth table above and in response to decoding a refresh command in combination with an active CS0/ (i.e. refresh to bank 0).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A memory module comprising:
   a plurality of memory devices;
   a control circuit configured to generate a chip select signal that is provided to each of said plurality of memory devices, wherein said chip select signal is dependent upon assertions of a first bank chip select signal and a second bank chip select signal;
   wherein said control circuit is further configured to generate an address signal that is provided to each of said plurality of memory devices, wherein said address signal is asserted dependent upon which of said first bank chip select signal and said second bank chip select signal are asserted.

2. The memory module as recited in claim 1, wherein each of said plurality of memory devices is coupled to a respective portion of a data path.

3. The memory module as recited in claim 1, wherein said control circuit is further configured to assert said address signal in response to said second bank chip select signal being asserted.

4. The memory module as recited in claim 1, wherein said control circuit is further configured to receive and decode a plurality of control signals and to generate said chip select signal in response to decoding a refresh command and detecting an assertion of said first bank chip select signal.

5. The memory module as recited in claim 1 further comprising a serially accessible storage unit configured to store information including memory module identification information.

6. The memory module as recited in claim 1 further comprising a serially accessible storage unit configured to store information including error detection information.

7. The memory module as recited in claim 6, wherein said serially accessible storage unit is a serial EEPROM.

8. The memory module as recited in claim 1 further comprising a clock circuit configured to provide clocking signals to each of said plurality of memory devices in response to receiving a pair of differential clock signals.

9. The memory module as recited in claim 1 further comprising an edge connector including a plurality of contacts providing connections between said memory module and a memory controller.

10. The memory module as recited in claim 9, wherein said first bank chip select signal and said second bank chip select signal are received at said edge connector.

11. The memory module as recited in claim 1, wherein said plurality of memory devices are logically arranged to form a single bank of sequentially addressable locations and wherein said plurality of memory devices are physically arranged in a single rank.

12. The memory module as recited in claim 11, wherein said address signal is provided to each of said plurality of memory devices for accessing an upper portion of said sequentially addressable locations.

13. The memory module as recited in claim 11 further comprising a buffer circuit configured to receive a set of address signals from a memory controller and to provide said set of address signals to said plurality of memory devices.

14. The memory module as recited in claim 13, wherein said set of address signals is provided to each of said plurality of memory devices for accessing a lower portion of said sequentially addressable locations.

15. A computer system comprising:
    a processor;
    a memory controller coupled to said processor;
    a plurality of memory modules each coupled to said memory controller, wherein each of said plurality of memory modules includes:
      a plurality of memory devices;
      a control circuit configured to generate a chip select signal that is provided to each of said plurality of memory devices, wherein said chip select signal is dependent upon assertions of a first bank chip select signal and a second bank chip select signal;
      wherein said control circuit is further configured to generate an address signal that is provided to each of said plurality of memory devices, wherein said address signal is asserted dependent upon which of said first bank chip select signal and said second bank chip select signal are asserted.

16. The computer system as recited in claim 15, wherein said control circuit is further configured to assert said address signal in response to said second bank chip select signal being asserted.

17. The computer system as recited in claim 15, wherein said control circuit is further configured to receive and decode a plurality of control signals and to generate said chip select signal in response to decoding a refresh command and detecting an assertion of said first bank chip select signal.

18. A method of emulating a two rank memory module using a single rank memory module, said method comprising:
    receiving a first bank chip select signal and a second bank chip select signal on said single rank memory module;
    generating a chip select signal and providing said chip select to each of a plurality of memory devices mounted to said single rank memory module, wherein said chip select signal is dependent upon assertions of said first bank chip select signal and said second bank chip select signal;
    generating an address signal and providing said address signal to each of said plurality of memory devices, wherein said address signal is asserted dependent upon which of said first bank chip select signal and said second bank chip select signal are asserted.

19. The method as recited in claim 18 further comprising asserting said address signal in response to said second bank chip select signal being asserted.

20. The method as recited in claim 18 further comprising receiving and decoding a plurality of control signals and generating said chip select signal in response to decoding a refresh command and detecting an assertion of said first bank chip select signal.

21. A memory module comprising:
    means for receiving a first bank chip select signal and a second bank chip select signal;
    means for generating a chip select signal and providing said chip select to each of a plurality of memory devices mounted to said single rank memory module, wherein said chip select signal is dependent upon assertions of said first bank chip select signal and said second bank chip select signal;
    means for generating an address signal and providing said address signal to each of said plurality of memory devices, wherein said address signal is asserted dependent upon which of said first bank chip select signal and said second bank chip select signal are asserted.

22. The memory module as recited in claim 21, further comprising means for asserting said address signal in response to said second bank chip select signal being asserted.

23. The memory module as recited in claim 21 further comprising means for receiving and decoding a plurality of control signals and means for generating said chip select signal in response to decoding a refresh command and detecting an assertion of said first bank chip select signal.

* * * * *